Aug. 17, 1948.  J. K. HAMILTON  2,447,067
VALVE ASSEMBLY FOR PRESSURE
REGULATORS AND THE LIKE
Filed June 1, 1944
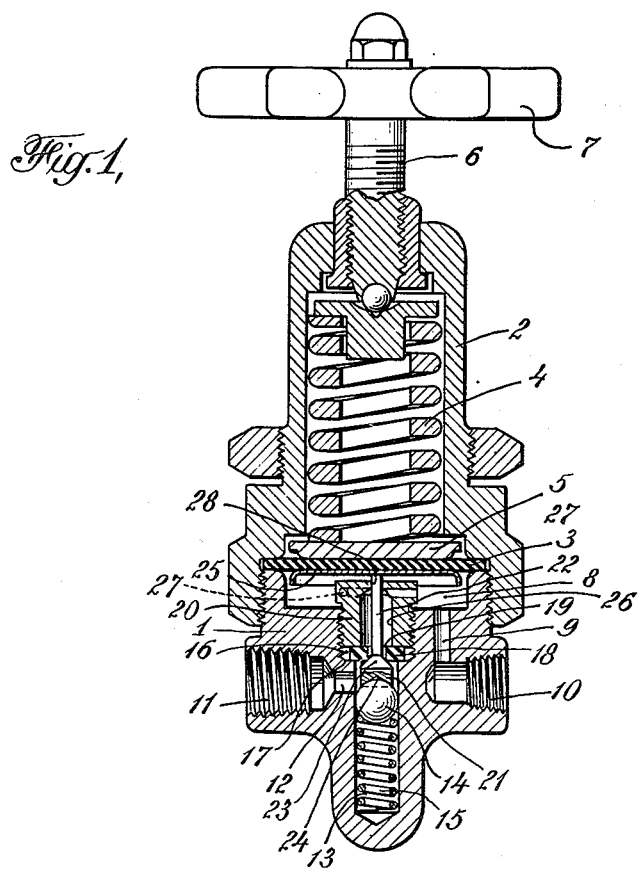
Fig. 1,
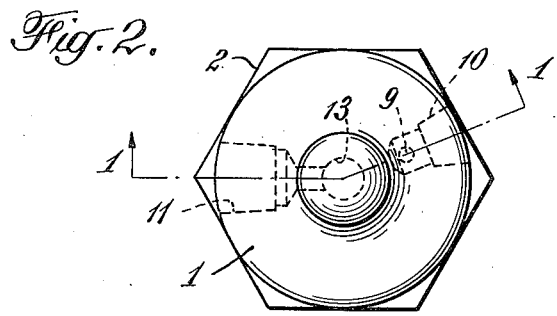
Fig. 2.
INVENTOR.
James K. Hamilton
BY
ATTORNEYS Patented Aug. 17, 1948

2,447,067

UNITED STATES PATENT OFFICE 2,447,067

VALVE ASSEMBLY FOR PRESSURE REGULATORS AND THE LIKE

James K. Hamilton, Plainfield, N. J., assignor to Air Reduction Company, Incorporated, a corporation of New York Application June 1, 1944, Serial No. 538,233

4 Claims. (Cl. 50—23)

1

This invention relates to gas pressure regulators and to a valve assembly that is particularly adapted for use in such a regulator.

The invention is an improvement on the regulator and valve assembly of the patent to G. M. Deming, No. 2,049,382, issued July 28, 1936. The regulator shown in that patent is of the inverse type, i. e., the valve element closes in the direction in which the pressure acts. The valve seat is formed on a separate member clamped in the regulator body by a threaded plug which has an interiorly chamfered skirt which engages the seat member to center it when the plug is turned to clamp the seat member in place. The stem of the valve extends through a port in the seat member and through a long, narrow guide passage in the plug into thrust relationship with the regulator diaphragm. The valve and valve stem are small and delicate, being in the nature of a pin of the household type with its point clipped off. The long, narrow guide passage in the plug encircles the valve stem throughout a major portion of its length and prevents the valve stem from bending. The valve is urged toward its seat by a coil spring in a chamber at the upstream side of the valve. The spring acts on a steel ball which is guided in the chamber and the ball in turn bears against the convex head of the pin-type valve element. While, as stated in the Deming Patent, the centering of the seat member by the plug to align the long, narrow guide passage in the plug with the narrow port in the seat member is a feature that was adopted along with others to eliminate especially accurately manufacturing work in making a regulator of the particular type shown in the patent, the changes contemplated by my invention still further reduce the necessity of close machining tolerances.

In accordance with this invention the valve seat is on a separately formed member clamped in place by a threaded plug, as in the Deming patent, and a spring-pressed steel ball bearing against the head of the valve is also employed, but instead of the seat member being centered by the plug which clamps it in position, it is centered by the valve element which in turn is held centered mainly by the steel ball which engages in a recess in the head of the valve for this purpose instead of bearing against a convex surface on the valve head as in the Deming patent. The valve element is also guided to a large extent during its movement by the steel ball. Eliminating the necessity of guiding the valve stem throughout a major portion of its

2 length by the plug makes it possible to provide a large clearance in the plug around the valve stem except near the end of the stem where the plug guides it throughout a very small portion of its length. This, coupled with the centering of the valve seat by the valve element, and the centering and guiding of the valve element by the steel ball engaging in the recess in the valve head, lessen the need for small tolerances in making the parts and reduce the cost of manufacture.

A gas pressure regulator embodying the invention is illustrated in the accompanying drawing, in which:

Figure 1 is a longitudinal section through the regulator, the section being taken on the line 1—1 of Fig. 2, and Figure 2 is an end view of the regulator shown in Fig. 1.

The regulator shown in the drawing has a body 1 and a spring housing 2 between which a diaphragm 3 is clamped. Within the housing 2 there is an adjusting spring 4 acting on the upper side of the diaphragm through a bearing plate 5. The pressure of the spring 4 is adjustable by means of a screw 6 which may be turned by a handle 7.

The body 1 is formed with a low-pressure cavity 8 at the under-side of the diaphragm, the gas passing from this cavity through a passage 9 to the delivery connection 10.

The inlet or high-pressure connection 11 is connected by a port 12 with a cylindrical axial chamber 13 bored in the lower portion of the body 1. Guided in this chamber there is a steel ball 14 which has a rather close fit in the chamber. A helical spring 15 in the chamber 13 exerts a thrust upon the ball.

An enlarged counter-bore 16 is provided in the body 1 between the chamber 13 and the low-pressure cavity 8 and is coaxial with the chamber 13. The counter-bore 16 forms a shoulder 17 against which an annular seat member 18 made of hard rubber or other suitable material, is held. The seat member 18 has a port 19 extending through it. The counter-bore 16 is threaded to receive a metal plug 20. This plug holds the seat member 18 against the shoulder 17.

A valve element has a head portion 21, a stem 22, and a conical valve portion 23 which cooperates with the seat on the member 18 at its high-pressure side. In the particular regulator shown in the drawing the edge of the inlet end of the port 19 constitutes the valve seat. The spring-pressed steel ball 14 engages in a conical recess 24 in the head portion 22 of the valve element. The axis of this conical recess is coincident with the axis of the valve element. The valve stem 23 projects into engagement with a thrust plate 25 engaging the under-side of the diaphragm 3.

The plug member 20 has a central bore 26 which provides a substantial clearance around the valve stem throughout the major portion of the length of the stem as shown in the drawing. The gas which passes through the central port of the valve seat passes into this bore and then into the low-pressure cavity 8 through a number of radial passages 27 in the upper part of the plug.

Because of the relatively long and large clearance between the plug 20 and the valve stem, the plug has no long, narrow guide passage for the valve stem, as in the above-mentioned Deming patent, but only a relatively short guide opening 28 near the end of the valve stem. The lower end of the plug 20 has a substantially flat face which engages the seat member 18, as shown in the drawing, and when the plug is screwed in place during assembling of the regulator the plug itself has no centering action on the seat member. However, since the steel ball 14 has a close fit in the chamber 13 and is guided rectilineally by this chamber, and since the ball engages in the conical recess in the head of the valve element, the head end of the valve element is centered during assembling of the regulator and guided in true coaxial relationship with the plug 20 when the latter is positioned. Thus, when the seat member is inserted into the body 1 it is automatically centered by the conical valve portion of the valve element which itself is held centered by the ball 14, as just stated. It will be understood that there is sufficient clearance in the counterbore 16 around the seat member to permit the seat member to shift laterally a slight amount if necessary in centering itself on the valve element. When the plug 20 is screwed home the already centered valve seat is clamped in position against the shoulder 17. The valve stem is guided throughout a very small portion only of its length near the end of the stem. This considerably lessens the need for small tolerances in making the parts and reduces the cost of manufacture.

It will be understood that when the regulated pressure in the cavity 8 tends to decline, the lessened gas pressure against the diaphragm 3 permits the relatively strong spring 4 to open the valve slightly wider, overcoming the spring 15, whereas if the delivery pressure of the regulator tends to rise, the increase of gas pressure against the diaphragm overcomes the spring 4 and permits the spring 15, plus the high inlet gas pressure, to move the valve toward its seat.

I claim:

1. A valve assembly for pressure regulators and the like comprising a body, a separately formed ported seat member held in the body and provided with a valve seat, a valve element cooperating with said seat and having a stem extending through the port in the seat member, the valve element also having a head provided with a recess, a spherical ball engaging in said recess, a chamber in said body in which the ball has a close fit and is guided rectilineally in the direction of movement of the valve element, said ball serving to center and guide the head end of the valve element, a spring in said chamber acting on said ball and tending to seat the valve element, said seat member being capable of lateral movement in the body before being clamped in place so that it will center itself when assembled on the valve element, and a threaded member in the body adapted to clamp the seat member rigidly in place after it is thus centered, said member engaging the valve stem to guide the same along a small portion only of the length of the stem near its end.

2. A valve assembly for pressure regulators and the like comprising a body, a separately formed seat member having a port extending through it the edge portion of which at the inlet end of the port constitutes a valve seat, a valve element having a conical valve portion cooperating with said seat and having a stem extending through the port in the seat member, said valve element also having a head provided with a conical recess, a chamber in said body coaxially disposed with respect to the valve element, a ball having a close fit in said chamber and guided rectilineally therein and engaging in said recess to center and guide the head end of the valve element, a spring in said chamber acting on said ball and tending to seat the valve element, said seat member being capable of lateral movement in the body before being clamped in place so that it will center itself on the conical valve portion of the valve element when the parts are assembled, and a threaded plug in the body having a flat face adapted to engage the seat member to rigidly clamp it in place after it is thus centered, said plug having a central passage through which the valve stem extends and providing a substantial clearance around the stem throughout a major portion of its length but forming a guide near the end of the valve stem which guides the stem along a small portion only of its length.

3. A pressure regulator having a body, a diaphragm, a separately formed ported seat member in the body, a valve element having a valve portion cooperating with the seat member and having a stem extending through the seat port into thrust relationship with said diaphragm, the head of said valve element having a recess, a spherical ball engaging in said recess, a chamber in said body in which the ball has a close fit and is guided rectilinearly in the direction of movement of the valve element, said ball serving to center and guide the head end of the valve element, a spring acting on said ball and tending to seat the valve element, said seat member being capable of lateral movement in the body before being clamped in place so that it will center itself when assembled on the valve element, and a threaded member in the body adapted to clamp said seat member rigidly in place after it is thus centered, said member being in guiding relationship with the stem of the valve element throughout a small portion only of the length of the valve stem near the end of the stem.

4. A pressure regulator having a body, a diaphragm, a separately formed ported seat member in the body capable of lateral movement before being clamped in place, a valve element having a valve portion cooperating with the seat member and having a stem extending through the seat port into thrust relationship with said diaphragm, the head of said valve element having a conical recess, a spherical ball engaging in said conical recess, a chamber in said body in which the ball has a close fit and is guided rectilinearly in the direction of movement of the valve element, said ball serving to center and guide the head end of the valve element, a spring acting on said ball and tending to seat the valve element, said seat member being capable of lateral movement in the body before being clamped in place so that it will center itself when assembled on the valve element, and a plug threaded in the body adapted to clamp said seat member rigidly in place after it is thus centered, said plug member being in guiding relationship with the stem of the valve element throughout a small portion only of the length of the valve stem near the end of the stem.

JAMES K. HAMILTON.

REFERENCES CITED

The following references are of record in the file of this patent:

UNITED STATES PATENTS

| Number | Name | Date |
|---|---|---|
| 75,094 | Whitaker | Mar. 3, 1868 |
| 1,566,255 | Spreen | Dec. 15, 1925 |
| 1,756,337 | Bowler | Apr. 29, 1930 |
| 1,807,200 | Dennison | May 26, 1931 |
| 2,082,227 | Stettner | June 1, 1937 |
| 2,330,610 | Natter | Sept. 28, 1943 |
| 2,342,659 | Grove | Feb. 29, 1944 |